(12) United States Patent
Liu et al.

(10) Patent No.: US 11,663,701 B2
(45) Date of Patent: *May 30, 2023

(54) USING PREVIOUSLY RENDERED SCENE FRAMES TO REDUCE PIXEL NOISE

(71) Applicant: Nvidia Corporation, Santa Clara, CA (US)

(72) Inventors: Shiqiu Liu, Santa Clara, CA (US); Jacopo Pantaleoni, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,782

(22) Filed: Apr. 27, 2021

(65) Prior Publication Data

US 2021/0264571 A1    Aug. 26, 2021

Related U.S. Application Data

(63) Continuation of application No. 16/530,854, filed on Aug. 2, 2019, now Pat. No. 10,991,079.

(60) Provisional application No. 62/718,923, filed on Aug. 14, 2018.

(51) Int. Cl.
| | |
|---|---|
| *G06T 1/20* | (2006.01) |
| *G06T 5/00* | (2006.01) |
| *G06T 5/20* | (2006.01) |
| *G06T 5/40* | (2006.01) |
| *G06T 15/06* | (2011.01) |
| *G06T 15/50* | (2011.01) |

(52) U.S. Cl.
CPC ............... *G06T 5/002* (2013.01); *G06T 1/20* (2013.01); *G06T 5/20* (2013.01); *G06T 5/40* (2013.01); *G06T 15/06* (2013.01); *G06T 15/50* (2013.01); *G06T 2207/20182* (2013.01)

(58) Field of Classification Search
None
See application file for complete search history.

(56) References Cited

U.S. PATENT DOCUMENTS

2017/0023500 A1    2/2017 Csefalvay
2017/0169602 A1*   6/2017 Blackmon ............... G06T 15/06

OTHER PUBLICATIONS

Corso, et al.; "Interactive Stable Ray Tracing"; HPG '17, Los Angeles, CA; DOI: 10.1145/3105762.3105769; Jul. 30, 2017; 10 pgs.

* cited by examiner

*Primary Examiner* — Robert J Craddock

(57) ABSTRACT

This disclosure presents a method and computer program product to denoise a ray traced scene. An apparatus for processing a ray traced scene is also disclosed. In one example, the method includes: (1) generating filtered scene data by filtering modified scene data from original scene data utilizing a spatial filter, and (2) providing a denoised ray traced scene by adjusting the filtered scene data utilizing a temporal filter. The modified and adjusted scene data can be sent to a rendering processor or system to complete rendering to generate a final scene.

20 Claims, 7 Drawing Sheets

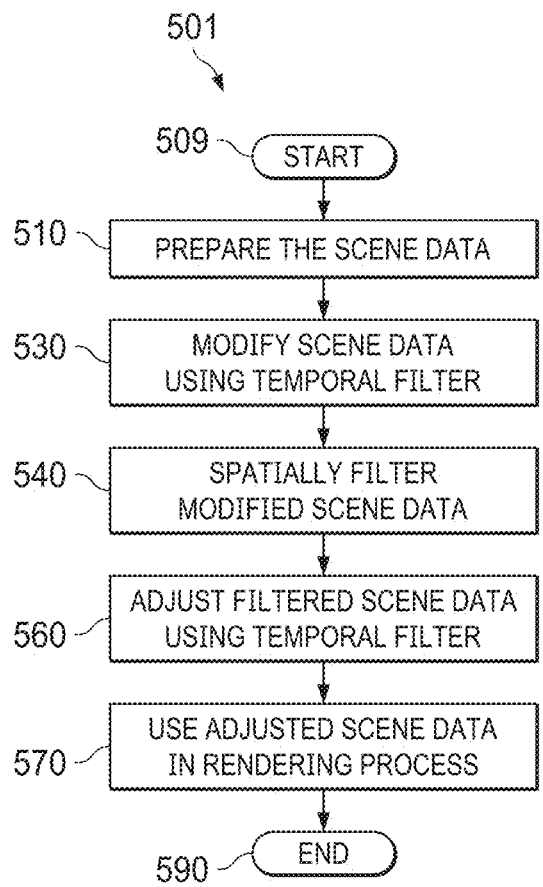
FIG. 5A
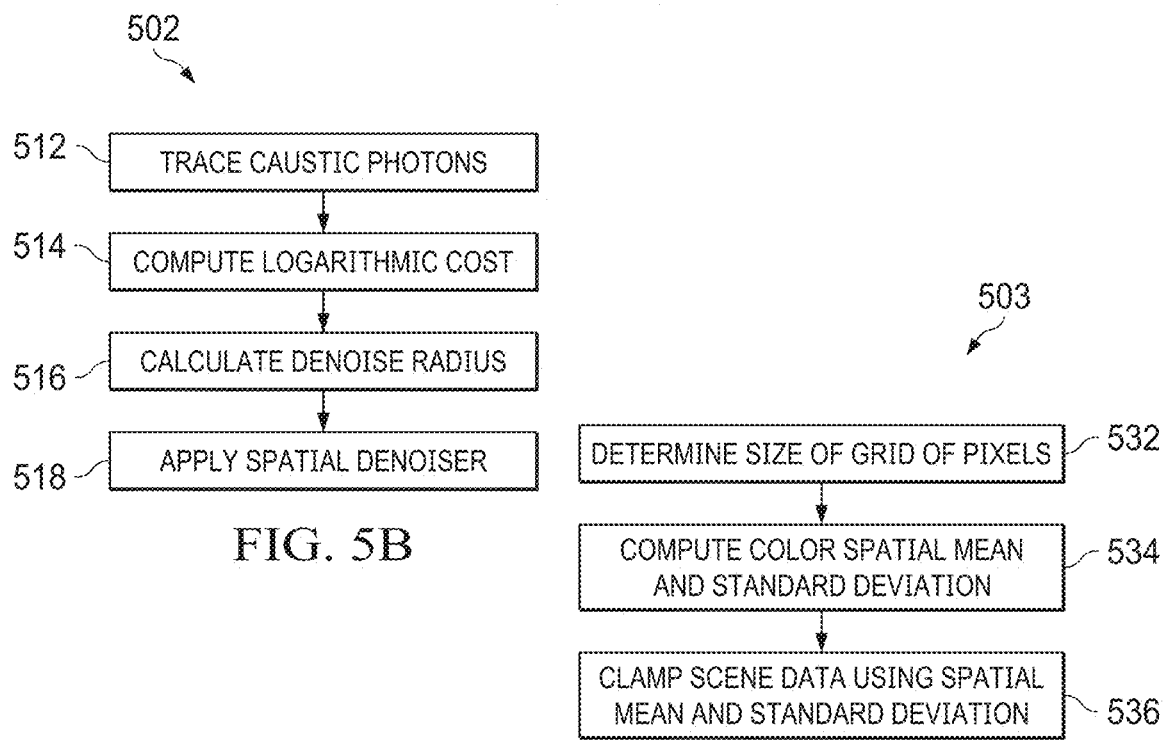
FIG. 5B
FIG. 5C

USING PREVIOUSLY RENDERED SCENE FRAMES TO REDUCE PIXEL NOISE

CROSS-REFERENCE TO RELATED APPLICATION

This application is a continuation of U.S. Non-Provisional application Ser. No. 16/530,854, filed by Shiqiu Liu, et al. on Aug. 2, 2019, which claims the benefit of U.S. Provisional Application Ser. No. 62/718,923, filed by Shiqiu Liu, et al. on Aug. 14, 2018, entitled "TEMPORAL-SPATIAL DENOISERS IN RAY TRACING APPLICATIONS," both which are commonly assigned with this application and incorporated herein by reference in its entirety.

TECHNICAL FIELD

This application is directed, in general, to raytracing rendered scenes and, more specifically, to denoising ray traced scenes.

BACKGROUND

Compared to other rendering techniques, ray tracing can provide a high visual quality for complex lighted images and scenes, such as when rendering a scene from an application that includes shadows or reflections. As the number of rays traced between the view perspective, object, and light source increase, a higher visual quality can be achieved. For complex lighted scenes, a large number of rays may be required when rendering in order to achieve a visual quality threshold.

With an increase in the number of rays, the amount of computing processing time to complete the computations also increases. The increase in the number of rays, and the resulting increase in computational time, can cause the rendering process to fall below a specified number of frames per second threshold or target value. As the frames per second decreases, a user may be able to perceive the slow rendering process, thereby reducing the overall visual quality for the user. Applications may reduce the visual quality of a scene, e.g., use less rays in the tracing, in order to maintain a targeted frames per second. A way to improve the scene rendering's visual quality while avoiding decreasing the frames per second would be beneficial.

SUMMARY

In one aspect, a method of denoising a ray traced scene is disclosed. In one embodiment, the method includes: (1) generating filtered scene data by filtering modified scene data from original scene data of a ray traced scene utilizing a spatial filter, and (2) providing a denoised ray traced scene by adjusting the filtered scene data utilizing a temporal filter.

In another aspect, an apparatus for processing a ray traced scene is disclosed. In one embodiment the apparatus includes a processor that generates modified scene data from original scene data utilizing an exponential average derived from temporal reprojections, filters the modified scene data utilizing a spatial filter, and adjusts the filtered scene data utilizing a temporal filter.

In yet another aspect, a computer program product having a series of operating instructions stored on a non-transitory computer-readable medium that directs a data processing apparatus when executed thereby to perform operations to denoise a ray traced scene is disclosed. In one embodiment, the operations include: (1) generating modified scene data by modifying scene data from an application, (2) generating filtered scene data by filtering the modified scene data utilizing a spatial filter, and (3) providing a denoised ray traced scene by adjusting the filtered scene data utilizing a temporal filter.

BRIEF DESCRIPTION

Reference is now made to the following descriptions taken in conjunction with the accompanying drawings, in which:

FIG. 5A is an illustration of a flow diagram demonstrating an example method to denoise a scene;

FIG. 5B is an illustration of a flow diagram demonstrating an example method, building on FIG. 5A, to prepare scene data using caustic photons;

FIG. 5C is an illustration of a flow diagram demonstrating an example method, building on FIG. 5A, to modify scene data using temporal filters;

DETAILED DESCRIPTION

Figure 1:
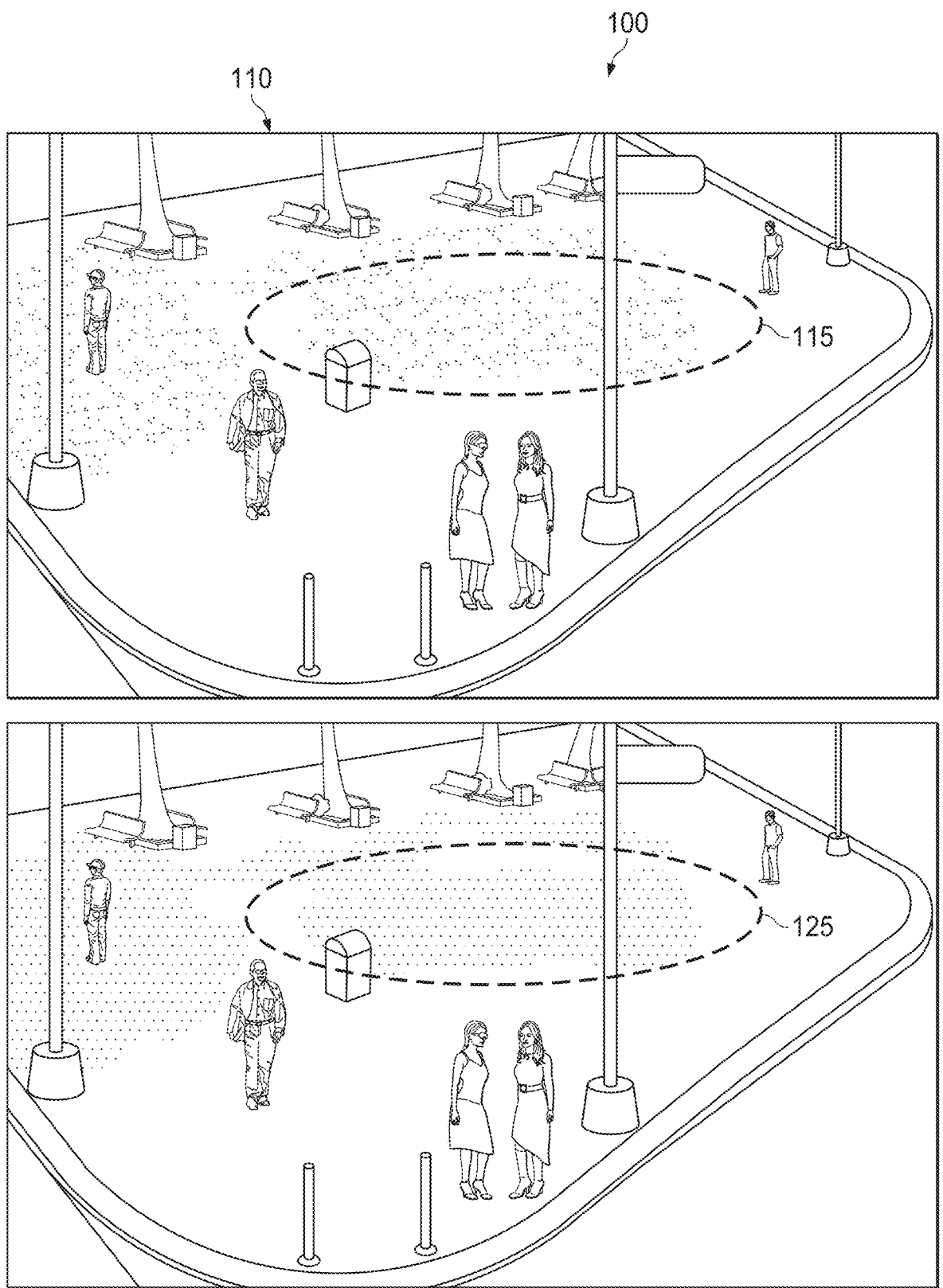
FIG. 1 is an illustration of an image set demonstrating example ray traced shadows.

An application, such as an action game, can produce scene data that specifies objects within a user's view in scenes and request that the scenes be generated and displayed. A user of the application has an expectation that each of the scenes or frames that are displayed is done so at a sufficient speed so that movement occurring within the application or game appears to be natural. The user also has an expectation that the scene will be displayed with a certain level of visual quality, e.g., visual artifacts like blurriness, spottiness, and other types of visual artifacts are not noticeable to the user.

Rendering is the general method for transforming the scene data from an executing application into a scene that can be displayed. As the scene becomes more complex, such as an increase in the number of objects and surfaces, the complexity of the rendering process can increase as well. For example, in a flight simulator, the scene may contain a single aircraft in a blue sky (a less complex scene), or it may contain dozens of fighter planes made of different materials circling one another (a more complex scene). The increase in objects and surface characteristics of the objects can lead to longer computing processing times to render the scene. Surface characteristics can include, for example, the texture of the surface, its reflectivity, and whether it is a light source or light absorber.

Complex scenes can also have more than one light source that creates multiple shadows or reflections when combined with multiple objects. For example, the above scene of fighter planes can include multiple search lights that cast shadows, which can overlay each other or overlay other objects within the scene. Each shadow needs to be rendered utilizing each light source and its relative interaction with the other overlaid shadows.

Ray tracing is a common technique for rendering scenes, especially where complex lighting is present. Ray tracing can be described as extending a line, i.e., ray, from the user's view perspective to an object within the scene, and then determining a second ray from that object to a light source. These rays can then be used to determine the amount of light hitting the object, at what angle the light is to the user view perspective, and how the color, texture, and other object characteristics are represented to the user. Ray tracing can use the intersections of these rays against the scene objects for further rendering computations. Ray tracing can be an alternative or supplement to traditional rendering techniques, such as rasterization, e.g., scene rendering using each displayable pixel, or light baking, e.g., scene rendering using static light effects.

Typically, rendering using ray tracing may require a large number of rays, from a few hundred to a few thousand depending on the complexity of the scene, to render a final scene that is at least at a targeted visual quality level. As the number of rays increases, the visual quality can increase at an expense of the computing processing time increasing. The visual quality level can be represented by a reduction in visual artifacts, such as visual noise, blurriness, peter panning (shadows can appear disconnected from the object), shadow acne (shadows become dotted), and other visual artifacts.

For example, using three rays per pixel (RPP) a scene can be computed relatively quickly but can result in a visually unpleasing scene that includes perceivable blurry edges between lighted areas and shadow areas. Using 196 RPP, can result in a significantly improved visual appearance as compared to the 3 RPP. The improved visual quality, however, comes with a cost of increased processing time for the 196 RPP over that of the 3 RPP execution. A similar comparison can be made for other scene characteristics, such as reflections.

In addition to the RPP, a scene rendering system can also have a targeted minimum frame rate for rendering the scene, for example, 30 frames per second (FPS), 60 FPS, or 120 FPS. FPS is the number of times the scene on the display or monitor is updated every second. Slower FPS can cause user perceivable flicker and other visual quality problems. As the computing processing time for rendering a scene increases, the potential impact on the overall rendering process can reduce the FPS experienced by the user. In certain applications, for example, an action game, the reduction of the rendering FPS can impact the user experience. Lowering the number of rays generated to maintain a targeted minimum number of FPS can reduce the visual quality experienced by the user.

This disclosure presents a way to reduce the visual artifacts, e.g., correcting or improving the rendering of scene characteristics, such as shadows, ambient occlusion, and reflections caused by existing ray tracing rendering techniques, while reducing the impact to the FPS rendering of the overall scene. This can be done by using previously rendered frame information in a current frame and employing an improved temporal denoising algorithm. Denoising is the reduction of noise, i.e., incorrect or seemingly random data values that may not blend or flow with the remaining portions of the scene. The technique can be used as part of an overall rendering process.

The overall rendering process can be executed in various ways. An application can call an application programming interface (API), a dynamic link library (DLL), or other type of function call to execute the rendering process. The rendering process can then execute the processes described herein. The API or DLL can be included, referenced, or instantiated by the calling application or another computing process to be an executable process. In an alternative, the application can call the temporal denoising processes directly. The temporal denoising processes can be included in the same or separate API, DLL, or other process from the other functions of the rendering process. The temporal denoising processes can be executed on general hardware, such a central processing unit (CPU) or a graphics processing unit (GPU). In some aspects, the temporal denoising processes can be included within a video driver of the GPU.

The return from the temporal denoising processes can be a portion of the scene that can be used in further rendering of the full scene. The portion of the scene can be an adjusted scene data. The scene data can be returned to the calling application or to the rendering process. The scene data can be further utilized by the rendering process to generate a final rendered scene.

If a portion of a scene is relatively static from scene frame to scene frame, then that portion of the current scene frame can use data gathered from the previous scene frames to reduce the visual artifacts. Do to the nature of computing system computations, pixels may not appear the same from scene frame to scene frame. This can occur if there is a slight movement occurring and, due to the various computations and rounding that occurs, the pixel changes drastically. For example, in a previous scene frame a pixel or set of pixels may have been in dark shadow. Due to a slight change in the scene, such as a view perspective shift or a change caused by action within the application (such as a plane moving or a search light sweeping across the scene), the pixel or set of pixels can appear to be much lighter. The described process can use the scene frame data previously gathered to smooth the scene and blend the much lighter pixels to better match the darker shadow since that is likely to improve the perceived visual quality of the pixel or set of pixels. The process of using the previously rendered scene data is called temporal reprojection.

The algorithm processing can utilize a temporal reprojection process. The temporal reprojection tracks a set of pixels as each new frame is rendered. If a pixel in the set of pixels remains substantially similar from the previous frame, the temporal reprojection count for that pixel is increased by one. If the pixel changes or is no longer part of the scene frame, then the temporal reprojection count is reset to zero. The temporal reprojection count can be stored in any conventional storage structure, such as a buffer, cache, or another type of memory. An exponential average is computed from the temporal reprojection counts and is applied to the scene data and auxiliary information, such as HitT distance, if present. The exponential average can be expressed as shown in Equation 1.

Equation 1: Example Exponential Average $$result\_value = (1-alpha)*history\_value + alpha*temporal\_reprojection\_count$$

where history_value is the previous result_value; and alpha is a blending factor, typically between 0.0 and 1.0, e.g., a percentage of the current scene frame as compared to the previously rendered scene frames.

In another aspect, a portion of the current scene data can be analyzed to determine a color spatial mean and a color standard deviation for that portion. The scene data, as modified by the exponential average can be clamped to a range using the color spatial mean and color standard deviation values. For example, the range can be greater than or equal to the color mean minus the color standard deviation and less than or equal to the color mean plus the color standard deviation. The clamping can improve the visual quality by reducing a ghosting affect.

A conventional spatial filter can be executed on the modified scene data. In some aspects, the radius used by the spatial filter can be reduced by using the temporal reprojection count. For example, a default, system, or application specified spatial filter radius can be divided by a square root of the temporal reprojection history count. And in some aspects, the divisor can be clamped to a maximum value. The temporal reprojection history count tracks the number of frames that a particular position has been rendered on screen. If the position has been occluded or moved out of the scene, then the count is reset to zero. Other heuristics can be utilized to reduce the spatial filer radius.

Next, another temporal filter pass can be executed on the filtered scene data. A larger radius than was used for the spatial filter can be used to collect the color mean and color standard deviation values when computing the clamping range. The extent of how much larger the temporal filter radius is compared to the spatial filter radius can be determined by a default, system, application, or user specified value. For example, the type of scene can determine the temporal filter radius size. A more complex scene can use a smaller radius than a simpler scene.

In some aspects, a global illumination (GI) factor can be utilized to modify the spatial filter radius. The GI reprojection history can be used to scale the spatial filter radius, for example, dividing the spatial filter radius by a square root of the GI reprojection history count. The GI reprojection history count can be stored in a storage structure, for example a separate buffer. The GI reprojection history count can be reset when a light source moves and the current scene data color is significantly different when compared to the reprojection history, e.g., the scene data color exceeds a differential value.

Depending on the type of light source movement, the differential value can vary from a very small amount, such as 1% frame lighting difference from the previous frame to a 100% difference in frame lighting from the previous frame. The rendering request, e.g., received from the application requesting the rendering, can provide an input parameter to indicate the value to be used for the differential value, e.g., what level indicates the significantly different threshold. The differential value can depend on various factors such as the color movement, e.g., object movement, within the frame, the luminescence of the frame, and other scene factors. The GI reprojection history can preserve more details in the filtered results while minimizing boiling visual artifacts, even when the scene is moving. The GI reprojection history can also be used for ambient occlusion and shadow affects.

In another aspect, caustic photon tracing can be utilized with the above processes. A set of caustic photons can be traced from the light source to the first diffuse or glossy surface. If a surface is 100% specular, then this aspect can be bypassed as it will not improve the visual quality. The process can count the number of caustic photons hitting, i.e., that intersect, each pixel within the scene portion being analyzed and store that number in a data structure, such as a buffer or a table.

A second step is to run a screen-space filter repeatedly to make a histogram of densities using the caustic photon tracing counts. The screen-space filter can use a progressively larger pixel window for the subsequent iterations. Typically, three to four iterations are computed. In other aspects, the number of iterations can be larger. The pixel windows can start with various sizes, such as a three pixel by three pixel window (3×3) or 5×5 pixel window. For example, starting with a 3×3 pixel window, the pixel windows can increase for the subsequent iterations, such as to a 9×9 pixel window, a 27×27 pixel window, and in some aspects, an 81×81 pixel window.

The stride used for each pixel window also increases. For example, for the 3×3 pixel window a stride of one is used, for the 9×9 pixel window a stride of three is used, and for the 27×27 pixel window a stride of nine is used. The stride is the offset distance from the center pixel and is used to find the caustic photon count. The pixels that fall within the stride count are used for that iteration's computations. The result can be a logarithmic cost in the final pixel window size. Other starting pixel window sizes can use other stride values.

A third step can extrapolate a denoising radius using the histogram from the screen-space filtering in step two. An initial denoising radius can be provided by a default value, a system value, an application specified value, or derived from the complexity of the scene data. The initial denoising radius can be modified by the number of caustic photons counted within the largest pixel window used in the histogram process. For example, the denoising radius can be divided by a square root of the total caustic photon count. This has the effect of reducing the denoising radius as the count of caustic photons increases. Other algorithms can be used to modify the denoising radius as well.

A fourth step can use the denoising radius, as modified in step three, to guide a spatial denoiser. Various conventional spatial denoisers can be utilized, such as an edge avoiding á-trous wavelet filter. Finally, the scene data, as spatially filtered in step four, can be run through the previously described temporal reprojection processes.

Turning now to the figures, FIG. 1 is an illustration of an image set 100 demonstrating example ray traced shadows. Image set 100 has two images, image 110 and image 120, that are both generated using a single RPP. Image 110 has a highlighted area 115 of a highly speckled shadow region that demonstrates the result of rendering shadows using one RPP.

Unlike image 110, image 120 has also been run through the denoising processes described herein. Image 120 has a highlighted area 125 demonstrating shadows rendered using one RPP combined with the denoising process. Highlighted area 125 shows an improvement in the shadow's visual quality as compared to highlighted area 115.

Figure 2:
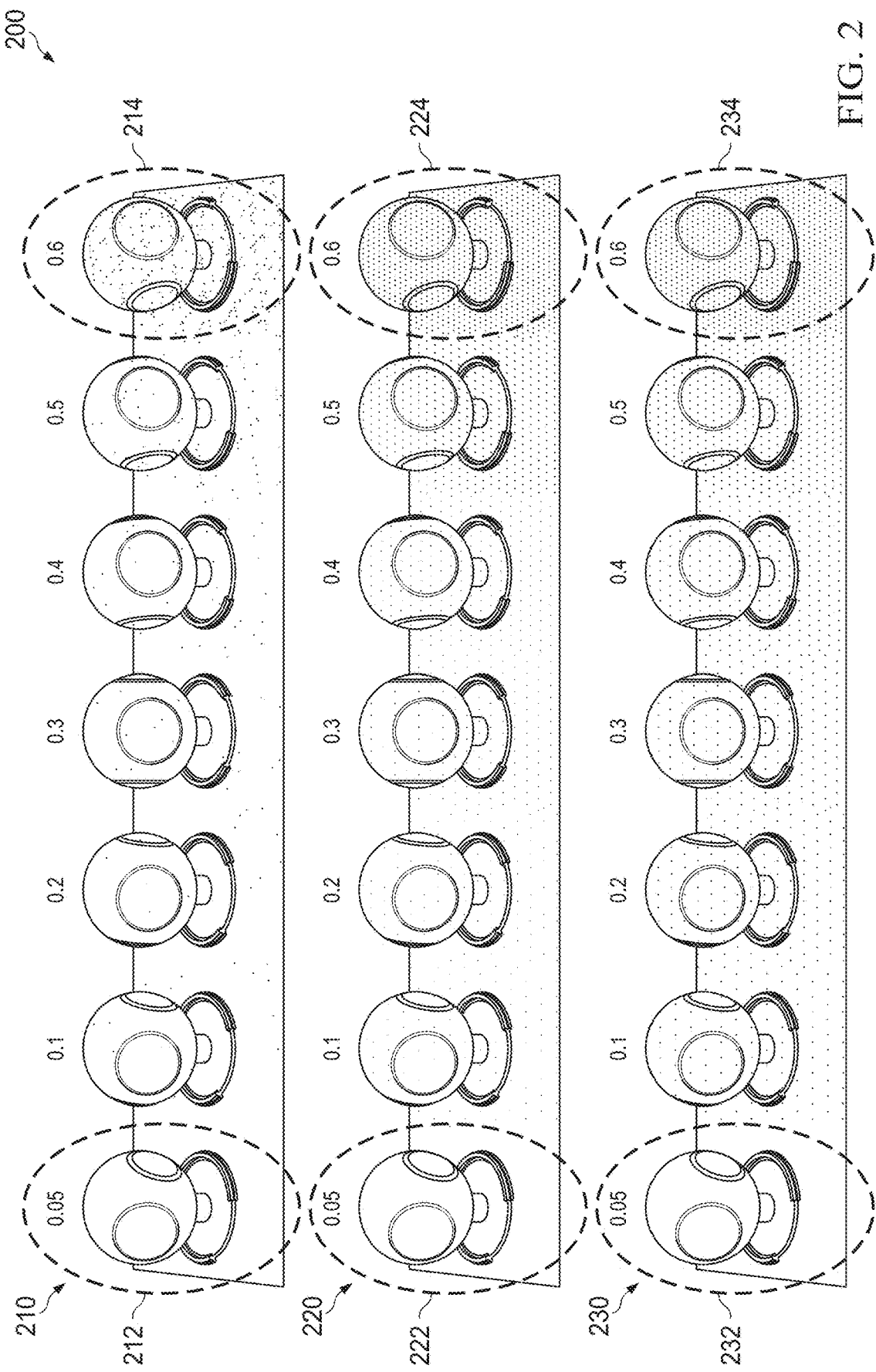
FIG. 2 is an illustration of an image set demonstrating example ray traced reflections.

FIG. 2 is an illustration of an image set 200 demonstrating example ray traced reflections. Image set 200 demonstrates that the temporal denoising algorithms provided herein can produce a higher visual quality than ray tracing alone when using a limited number of rays. Image set 200 has three images, image 210, image 220, and image 230, of several objects. Above each of the objects in images 210, 220, 230, is a reference number indicating surface roughness as measured using the squared GGX multifaceted model ($GGX^2$). Image 210 is generated using one RPP and has two highlighted areas, highlighted area 212 and highlighted area 214. Highlighted area 212 demonstrates a highly specular, i.e., reflective, surface having a surface roughness of 0.5 and rendered using one RPP. Highlighted area 214 demonstrates a predominantly diffuse, e.g., non-reflective, surface having a surface roughness of 0.6 and rendered using one RPP. As shown in highlighted area 214, the result is a speckled and blurry object.

Image 220 is generated using a one RPP ray tracing process combined with temporal denoising algorithms as described herein. Highlighted area 222 shows a similar highly specular surface as highlighted area 212 with a relatively small visual quality difference. Highlighted area 224 shows a similar predominantly diffuse surface as shown in highlighted area 214. Highlighted area 224 has a higher visual quality with less speckling; hence a sharper representation of the object. As the reflectivity of the surfaces of the objects decreases, such as the object of highlighted area 224 compared to the object of highlighted area 222, the improvements seen with the described denoising processes increases.

Image 230 is generated using significantly more RPP than for image 210 and image 220. Image 230 is a demonstration of an approximate ground truth, e.g., approximation of how the scene should appear visually. Highlighted area 232 shows the specular surface as previously shown in highlighted area 222 and highlighted area 212. Highlighted area 234 shows a predominantly diffuse surface as previously shown in highlighted area 224 and highlighted area 214. The objects shown in highlighted area 232 and highlighted area 234 are a closer match to the objects of highlighted area 222 and highlighted area 224, respectively.

Figure 3:
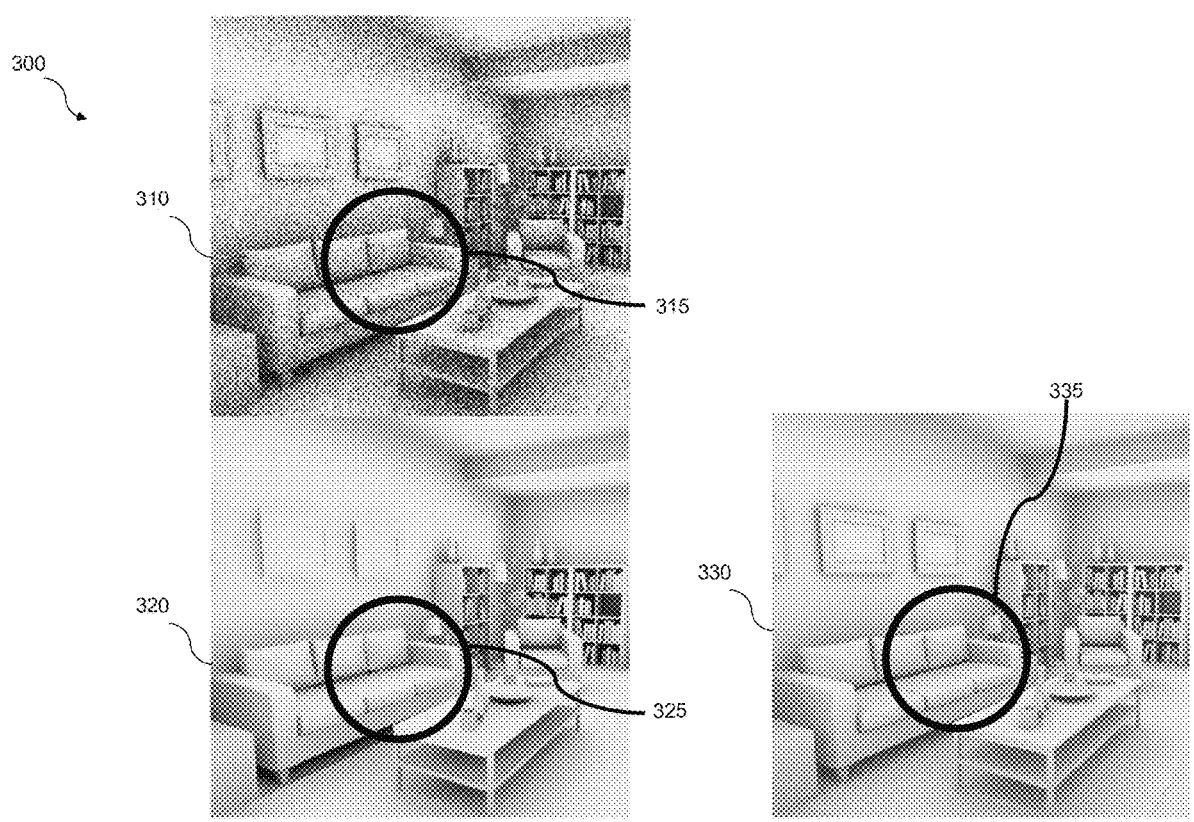
FIG. 3 is an illustration of an image set demonstrating example ray traced ambient occlusion.

FIG. 3 is an illustration of an image set 300 demonstrating example ray traced ambient occlusion and the advantage of using temporal denoising algorithms disclosed herein. Image set 300 includes an image 310, an image 320, and an image 330. Image 310 demonstrates a ray traced one RPP scene showing problems with the ambient occlusion, as represented by the dark halos around objects of the scene. Area 315 is highlighted to identify the visual artifact caused by the ambient occlusion processing using one RPP.

Image 320 demonstrates a ray traced scene using one RPP combined with the temporal denoising algorithms disclosed herein. Highlighted area 325 illustrates reduced visual artifacts caused by the ambient occlusion processing. Highlighted area 325 can be compared to highlighted area 315 to demonstrate the reduction of the visual artifacts.

Image 330 shows a ray traced scene generated using significantly more RPP than scenes from image 310 and image 320 generated using a single RPP. Image 330 represents an approximate ground truth for the scene. Highlighted area 335 shows a similar area to highlighted area 325 and highlighted area 315. Highlighted area 325 shows a closer match to the ground truth highlighted area 335 as compared to highlighted area 315.

Figure 4A:
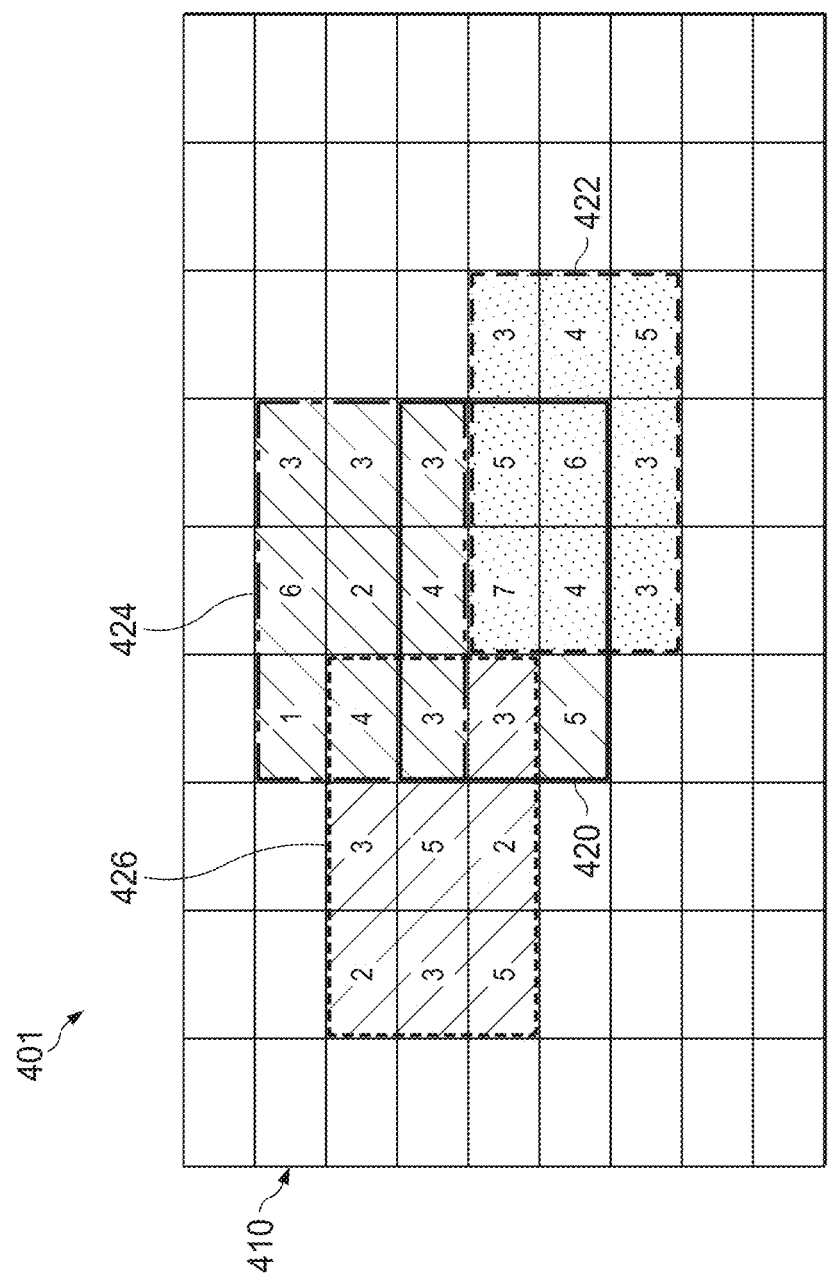
FIG. 4A is an illustration of a grid demonstrating an example iterative histogram computation using 3 by 3 pixel window overlays.

FIG. 4A is an illustration of a grid demonstrating an example of a computation using iterative histogram 401 and 3×3 pixel window overlays. Iterative histogram 401 is a visual representation of the computations that can occur within the denoising algorithm. The computations can be carried out by a computing system, such as a GPU, without the visual representation. The histogram computations can be used when executing the tracing caustic photon analysis of the disclosed algorithms and processes.

Iterative histogram 401 includes an identified set of pixels 410 to be analyzed. Set of pixels 410 can be the entire scene or a portion thereof, and is demonstrated using a grid structure. The histogram computation can use various pixel window sizes overlaid on set of pixels 410. In this example iterative histogram 401, a pixel window size of 9×9, i.e., set of pixels 410, is shown with multiple pixel windows of 3×3 highlighted inside the 9×9 pixel window.

Pixel window 420 is a 3×3 pixel window at the center of the 9×9 pixel window, as shown by the dark rectangular outline. Pixel window 422 is a 3×3 pixel window partially overlaying pixel window 420 and is shown with a dashed rectangular outline. Pixel window 424 is a 3×3 pixel window partially overlaying pixel window 420 and is shown with a dash-dot rectangular outline. Pixel window 426 is a 3×3 pixel window partially overlaying pixel windows 420 and 424 and is shown with a dotted rectangular outline.

Additional pixel windows can be defined as well to cover the remaining portions of the 9×9 pixel window. The pixel windows can partially overlay each other or be next to each other. The number of caustic photons intersecting each pixel is recorded. Then, within each 3×3 pixel window, the number of caustic photons is added. In this example, pixel window 420 equals 40; pixel window 422 equals 35; pixel window 424 equals 29; and pixel window 426 equals 30. Additional pixel windows can be computed as well. The computed totals of caustic photons for each pixel window is recorded, e.g., tagged, as if it belongs to the center pixel, i.e., the pixel of interest, of the pixel window. This represents the logarithmic cost for that pixel window. The described process can be repeated for each pixel within the pixel window.

Figure 4B:
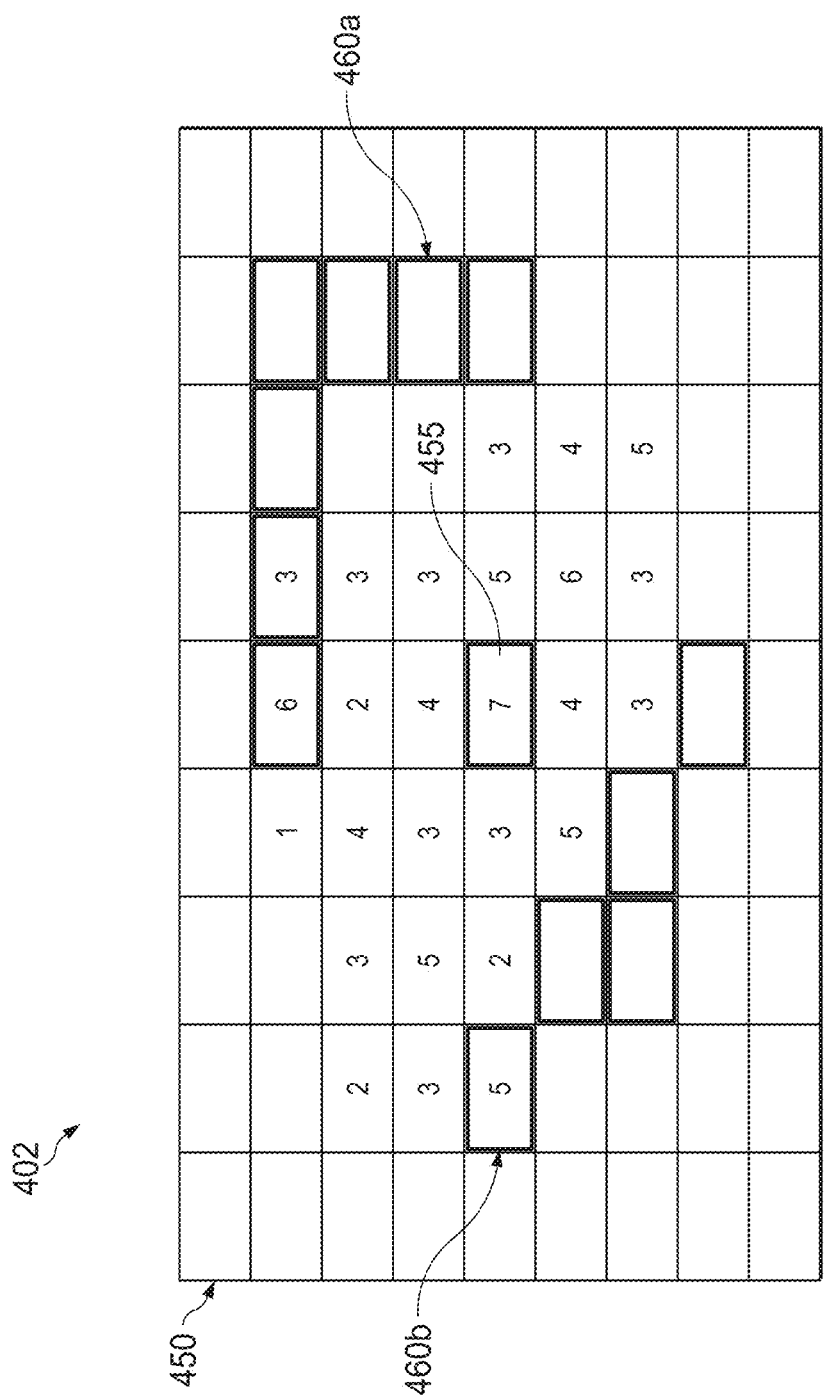
FIG. 4B is an illustration of a grid demonstrating an example iterative histogram computation, building on FIG. 4A, using a 9 by 9 pixel window and a stride of three.

FIG. 4B is an illustration of a grid demonstrating an example of a computation using iterative histogram 402, building on FIG. 4A, and a stride of three. Iterative histogram 402 includes a pixel window 450 of size 9×9. The results from the multiple 3×3 pixel windows from FIG. 4A are applied to the corresponding pixels of pixel window 450. The pixels indicated by outlined pixels 460a and 460b represent two different stride methods using a stride of three from center pixel 455. One or more stride methods can be selected and the results can be blended across the utilized methods to improve the results. Outlined pixels 460a represent a stride method of forming a rectangle by counting by the stride (in this case three), along the x and y axis. Outlined pixels 460b represent a stride method using a stride of three radius, e.g., a modified chess Rook style of pixel selection.

The totals found for each of the 3×3 pixel windows can be added to compute a caustic photon total for the 9×9 pixel window. In this iteration, the stride can be increased from one to three, e.g., every third pixel will be used to contribute to the caustic photon count. A total for the 9×9 pixel window can then be determined. A third or fourth iteration can be computed using larger pixel windows, and larger strides. The additional iterations can balance the additional computation costs against the higher visual quality that can be achieved.

The final total number of caustic photons computed, e.g., the final logarithmic cost, can be used to calculate a denoise filter radius. For example, one algorithm can use the square root of the number of photons computed as a divisor to divide a denoise radius modified, such as a system value or application supplied value, e.g., a specified default denoise radius. This can result in that the larger the number of photons computed, the smaller the denoise radius that will be used in the subsequent steps.

FIG. 5A is an illustration of a flow diagram demonstrating an example method 501 to denoise a scene. Method 501 starts at a step 509 and proceeds to a step 510 where the scene data is prepared. In step 510, the original scene data can be received, such as from a render process or an application call. In some aspects, the original scene data can be received along with auxiliary or supplemental data. The original scene data can include the scene image information from the original ray tracing process, such as the colors of each pixel in the scene. The auxiliary data can include HitT values, such as HitT distance information, for each pixel or set of pixels. If the auxiliary data is not provided, the information for the algorithms can be derived in step 510. In one example, the original scene data can be prepared according to method 502 described below.

In a step 530, the original scene data is modified using a temporal filter to generate a modified scene data. The filter uses an exponential average of the input, received from step 510, and the auxiliary data for modifying the original scene data. The exponential average is determined from the valid temporal reprojection samples attributed to each pixel, e.g., each pixel becomes the pixel of interest for processing the temporal filter. A separate buffer or storage mechanism can be used to store the count of the number of previous frames for which the pixel of interest has been substantially the same as to color, shade, and brightness. The reprojection count can be reset to zero if the reprojection fails, such as if the pixel changes substantially or if the pixel has moved into the view space from an off-view space position. In one example, the original scene data can be modified using the temporal filter according to method 503 described below.

In a step 540, the modified scene data is spatially filtered using the received scene data calculated in step 530 to generate a further modified scene data, e.g., a filtered scene data. Conventional spatial filters can be utilized, such as a bilateral filter with weights calculated based on the distance between pixels in world space, and the difference between normal and depth space. In other aspects, other conventional spatial filters can be used, such as point-to-point, mask based, linear, and other spatial filter types. In one example, the filtered scene data can be further modified using the spatial filter according to method 504 described below.

In a step 560, the filtered scene data is adjusted using a temporal filter to further modify the modified scene data. The radius used with the temporal filter can be larger than the spatial filter radius used in step 540. In some aspects, the radius can be modified by a default, system, or application value, which is divided by a square root of the temporal reprojection count. The value used for the modification can vary from scene to scene and can be modified scene data sensitive. For example, a more complex scene can use a different value than a simpler scene. Other factors can also be used to modify the value used for modifying the radius. In one example, the modified scene data can be further modified using the temporal filter according to method 505 described below. In a step 570, the further modified scene data is communicated back to the application or rendering process to complete the rendering of the scene and the output of the scene. Method 501 ends at a step 590.

FIG. 5B is an illustration of a flow diagram demonstrating an example method 502, building on FIG. 5A, to perform additional steps of step 510 to prepare original scene data using a set of caustic photons. Method 502 starts at a step 512 where caustic photons can be traced between objects and a light source. The first diffuse surface encountered can be recorded. As the surface becomes more specular, a reduction in the benefit provided by the caustic photon tracing occurs. Accordingly, when a surface that is 100% specular is encountered the remaining sub steps of step 510 can be bypassed, since minimal improvement in visual quality may be produced.

In a step 514, a logarithmic cost is computed. In some examples, the logarithmic cost can be computed as demonstrated in FIG. 4. The logarithmic cost can be computed using a pixel window of a specified starting size, such as 3×3. Other sizes can be used as well, such as 5×5. The pixel windows can be next to each other, or partially overlap. Multiple iterations of the logarithmic costs can be computed. For examples, three to four iterations can be computed. The stride is equal to one for the first iteration and is increased for a subsequent iteration proportionally to the size of the next pixel window. The stride is the number of pixels offset in a direction before computing the next caustic photon count. For example, a 3×3 pixel window uses a stride of one, a 9×9 pixel windows uses a stride of three, a 27×27 pixel window uses a stride of nine, and an 81×81 pixel window uses a stride of twenty-seven. Larger pixel windows can be used at a cost of an increase in computing processing time. A 5×5 starting pixel window can use 25×25, and 125×125 as the pixel window sizes for the subsequent iterations.

In a step 516, the denoise radius can be calculated. Given the computed caustic photon count from step 514, the radius can be modified by an algorithm. For example, a default, system, or application provided value can be divided by the square root of the computed caustic photon count and the resulting number can be multiplied by the default denoise radius. In a step 518, a conventional spatial denoiser, such as edge-á-trous wavelet filter, can be used with the resulting denoise filter to modify the original scene data. Method 502 then proceeds to step 530 of method 501.

FIG. 5C is an illustration of a flow diagram demonstrating an example method 503, building on FIG. 5A, to perform additional steps of step 530 to modify scene data using temporal filters. Method 503 starts at a step 532 where the pixel window size is determined. This can use a 5×5 pixel window, or another size, for example 3×3, 7×7, or 9×9. The pixel window size can be selected by the process using application and scene factors that the process determines would be computationally efficient for the visual quality desired. The pixel window size can be the same or different than what is used in other steps of the process.

In a step 534, the modified scene data for the determined pixel window is analyzed to determine the color mean and color standard deviation for all of the pixels within the pixel window by analyzing each pixel of interest within the pixel window. In a step 536, the modified scene data within the pixel window is clamped using the color spatial mean and the color standard deviation. The modified scene data can be clamped between a value that is greater than or equal to the mean minus the standard deviation, and a value that is less than or equal to the mean plus the standard deviation. Each pixel of the pixel window is analyzed by the clamping process. Method 503 then proceeds to step 540 of method 501.

Figure 5D:
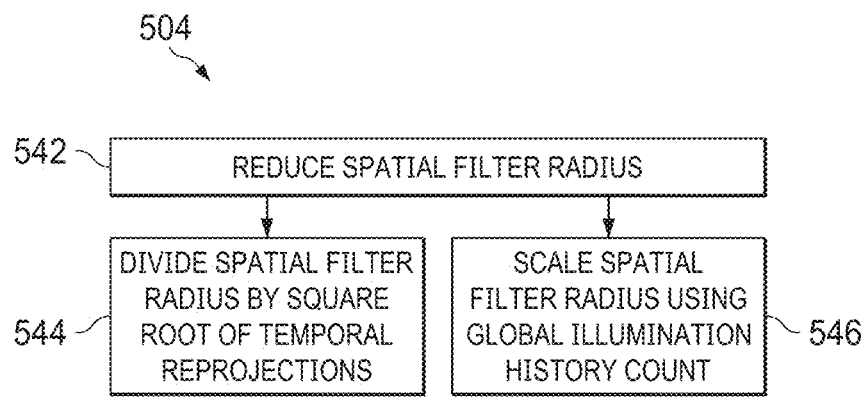
FIG. 5D is an illustration of a flow diagram demonstrating an example method, building on FIG. 5A, to spatially filter scene data.

FIG. 5D is an illustration of a flow diagram demonstrating an example method 504, building on FIG. 5A, to perform additional steps of step 540 to spatially filter the modified scene data. Method 504 starts at a step 542 where the spatial filter radius is reduced. Various algorithms can be applied to reduce the spatial filter radius. In this example method 504, step 542 can select one or more algorithms to reduce the radius. Steps 544 and 546 represent two of the algorithms. In step 544, the temporal reprojections can be used. For example, the default spatial filter radius can be divided by a square root of the accumulated running total of temporal reprojections as determined in step 530.

In step 546, a global illumination buffer can be used to store a history count for each pixel, where the history count can be used to scale the spatial filter radius. The scaling can follow a similar algorithm of using the filer radius divided by the square root of the history count. If the scene or light source moves, and the frame color is significantly different from the reprojection history, then the counts can be reset to zero. Method 504 then proceeds to step 560 of method 501.

Figure 5E:
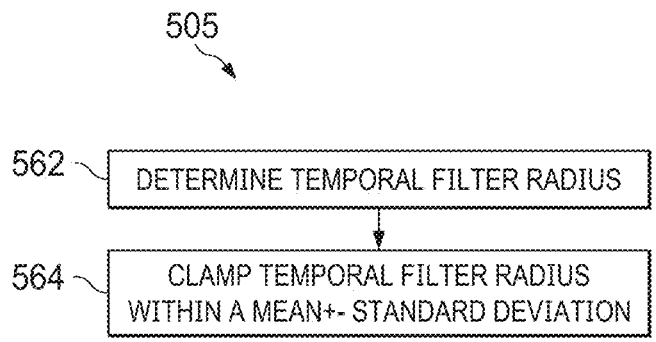
FIG. 5E is an illustration of a flow diagram demonstrating an example method, building on FIG. 5A, to adjust filtered scene data using a temporal filter.

FIG. 5E is an illustration of a flow diagram demonstrating an example method 505, building on FIG. 5A, to perform additional steps of step 560 to adjust the modified scene data using a temporal filter. The method 505 starts at a step 562 where the temporal filter radius can be determined. The complexity of the scene or other factors can be used to determine the weighted value to be used to modify the radius.

In a step 564, the temporal filter radius can be clamped to a radius that falls within a specified range. The range can be the mean minus the standard deviation to the mean plus the standard deviation. The mean and standard deviation values can be derived from a certain range or pixel window. Method 505 then proceeds to step 570 of method 501.

Figure 6:
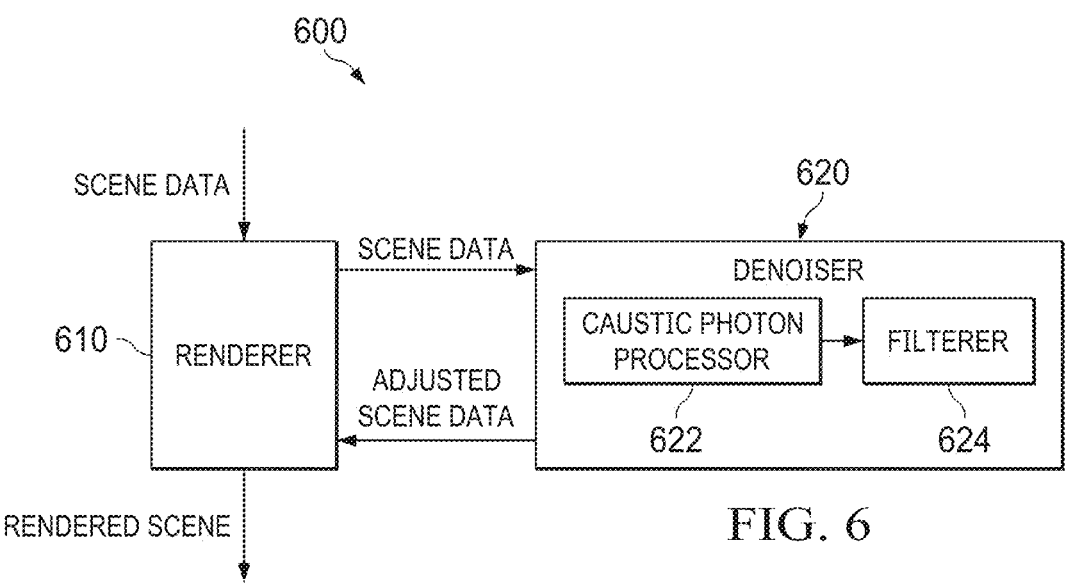
FIG. 6 is an illustration of a block diagram demonstrating an example temporal filter denoise system.

FIG. 6 is an illustration of a block diagram demonstrating an example temporal filter denoise system 600. Temporal filter denoise system 600 can receive the original scene data, process that data for shadow, ambient occlusion, and reflection related details, and modify the original scene data using the denoiser processing algorithms to provide a modified scene data. The modified scene data can be used by the rendering engine or an application to render the scene. Temporal filter denoise system 600 includes a renderer 610, which can be a processor, and a denoiser 620. Denoiser 620 further includes a caustic photon processor 622 and a filterer 624. The components of temporal filter denoise system 600 can be combined or separated into various combinations of functionality. For example, renderer 610 and denoiser 620 can be combined into a single processor executing the combined functionality. Other combinations are possible for these components.

Denoiser 620 components represent the logical system performing the processing functions described for each component. The components can be implemented using a hardware device(s), such as a CPU, GPU, or other processor, and can be implemented in application code. The application code can execute on the hardware devices. The functionality can be part of a video driver, a DLL, an API, a separate application, or be embedded as features within a GPU. A video driver, DLL, or API can be instantiated or referenced as appropriate to enable usage of the described functionality. In some aspects, the functions of denoiser 620 can be combined with renderer 610, such as being included in the same video driver or DLL.

Renderer 610 can receive original scene data from an application, computing system, or another process, such as through an API, DLL, or other input mechanisms. The original scene data can include the scene information and auxiliary information, for example, HitT values. The executing application generating the original scene data can be executing on the same or different computing system as temporal filter denoise system 600. Renderer 610 can render the original scene data using a conventional ray tracing algorithm. The number of rays used for each pixel can be limited to maintain a targeted FPS for the application.

The rendered scene data can then be communicated to denoiser 620. The rendered scene data can be pre-processed by denoiser 620, such as generating auxiliary data. As an option, the rendered scene data can be sent to caustic photon processor 622. Caustic photon processor 622 can trace caustic photons and compute a logarithmic cost using several iterations, such as described in FIG. 5B. Caustic photon processor 622 can then modify the denoise radius using the logarithmic cost and apply a spatial denoiser using the modified denoise radius. Caustic photon processor 622 can then send the modified scene data to filterer 624.

In some aspects, caustic photon processor 622 can be bypassed. Whether caustic photon processor 622 is utilized or bypassed, filterer 624 receives the respective rendered or modified scene data. Filterer 624 can use temporal reprojections to compute an exponential average that can be applied to the pixels within a specified pixel window. Filterer 624 can also compute the color mean and color standard deviation to determine a clamping range for the values. A spatial filter can be run on the modified scene data within the pixel window currently being analyzed. Filterer 624 can run a temporal filter pass on the modified scene data. In some aspects, filterer 624 can use a global illumination history count, using temporal history from previous frames, to scale the spatial filter radius. The further modified scene data can be sent by filterer 624 back to renderer 610 or back to a calling application or process. Renderer 610 can complete the rendering process using the further modified scene data and output a rendered scene.

This disclosure presents a way to keep the number of rays used in ray tracing to a lower number, thereby also reducing the computing processing time, while increasing the visual quality. Visual quality can be increased by decreasing the visual artifacts, e.g., reducing blurriness and reducing shadow problems. This can be accomplished by using previously rendered frame information in the current scene frame.

An application, such as a game application, a real-time action simulation, a multiplayer adventure, or other types of executing applications, e.g., computer aided drawing systems, can request that a scene be displayed on a monitor, printed, or stored in a computing storage device, such as a hard drive or a USB drive. The application can produce scene data, such as specifying objects that are within the user's view perspective. The application can also specify, as part of the scene data, one or more images, animated portions, one or more frames of video, and other viewable content to be combined to create the final scene. The application, through a rendering request, can send the one or more sets of scene data to a rendering process to transform the scene data into a format that can be further utilized, such as for display to a display device, monitor, printer, or types of displays. In some aspects, a new set of scene data can be sent to the rendering process multiple times per second to provide the user with a smooth video like visual experience.

The rendering process can use ray tracing for rendering a scene; especially a complex scene including shadow and reflections. Traditional approaches to rendering reflections include reflection capturers and rendering planar reflections. These approaches present disadvantages. Reflection capturers for example, can be static, with dynamic rendering rarely being advantageous. Further, reflection capturers can generate incorrect results when not placed correctly, with a roughness range that can be approximated using a fixed number of levels. Reflection capturers can have additional drawbacks depending on the view perspective angle. For example, a pre-integrated reflection capturer with a view vector that is perpendicular to the receiver plane can miss neural density filter anisotropy. Planar reflections also can present disadvantages. For example, they work principally for planar surfaces, do not scale well, and cannot render stochastic glossy reflections. Ray traced reflections offers a solution that avoids these disadvantages endemic to traditional reflection capturers and planar reflections.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of denoising a ray traced scene, comprising:
generating filtered scene data by filtering modified scene data from original scene data of a ray traced scene utilizing a spatial filter and a spatial filter radius; and
providing a denoised ray traced scene by adjusting the filtered scene data utilizing a temporal filter and a temporal filter radius that is larger than the spatial filter radius.

2. The method as recited in claim 1, further comprising generating the modified scene data by modifying the original scene data utilizing an exponential average of temporal reprojections.

3. The method as recited in claim 2, wherein utilizing the exponential average includes clamping the temporal reprojections using a color spatial mean and a color standard deviation associated with a pixel window of the original scene data.

4. The method as recited in claim 1, wherein utilizing the spatial filter includes reducing the spatial filter radius based on a number of a temporal reprojections within the spatial filter radius.

5. The method as recited in claim 4, further comprising determining the number by dividing the spatial filter radius by a square root of the number of temporal reprojections within the spatial filter radius, wherein the square root of the number of temporal reprojections is clamped to a maximum value.

6. The method as recited in claim 1, wherein adjusting the filtered scene data further comprises clamping the temporal filter radius utilizing a color spatial mean and a color standard deviation associated with the original scene data.

7. The method as recited in claim 1, wherein filtering the modified scene data further comprises scaling the spatial filter radius using a global illumination history count.

8. The method as recited in claim 1, further comprising preparing the original scene data before the modifying by applying a spatial denoiser to the scene data utilizing a denoise radius.

9. The method as recited in claim 8, wherein the denoise radius is based on a set of caustic photons from a light source that are positioned on a surface of an object in the ray traced scene and a logarithmic cost of the set of caustic photons that intersect pixels of a pixel window of the original scene data.

10. The method as recited in claim 1, further comprising receiving the original scene data, wherein the original scene data corresponds to a scene from a game application.

11. An apparatus for processing a ray traced scene, comprising:
a processor that generates modified scene data from original scene data utilizing an exponential average derived from temporal reprojections, filters the modified scene data utilizing a spatial filter and a spatial filter radius, and adjusts the filtered scene data utilizing a temporal filter and a temporal filter radius that is larger than the spatial filter radius.

12. The apparatus as recited in claim 11, further comprising a processor that computes a logarithmic cost utilizing an iterative count of caustic photons, and applies the spatial filter to the modified scene data using the spatial filter radius modified by the logarithmic cost.

13. The apparatus as recited in claim 11, further comprising a processor that renders a scene employing the modified scene data.

14. The apparatus as recited in claim 11, wherein the processor reduces the spatial filter radius based on a number of a temporal reprojections within the spatial filter radius.

15. The apparatus as recited in claim 11, wherein the processor clamps the temporal filter radius utilizing a color spatial mean and a color standard deviation associated with the original scene data.

16. The apparatus as recited in claim 11, wherein the processor prepares the original scene data by applying a spatial denoiser to the scene data utilizing a denoise radius.

17. The apparatus as recited in claim 11, wherein the processor is a graphics processing unit (GPU).

18. A computer program product having a series of operating instructions stored on a non-transitory computer-readable medium that directs a data processing apparatus when executed thereby to perform operations to denoise a ray traced scene, comprising:
- generating modified scene data by modifying scene data from an application;
- generating filtered scene data by filtering the modified scene data utilizing a spatial filter and a spatial filter radius; and
- providing a denoised ray traced scene by adjusting the filtered scene data utilizing a temporal filter and a temporal filter radius that is larger than the spatial filter radius.

19. The computer program product as recited in claim 18, further comprising clamping the temporal filter radius utilizing a color spatial mean and a color standard deviation associated with the original scene data.

20. The computer program product as recited in claim 18, further comprising receiving the scene from the application, wherein the application is a game application and the operations are performed on one or more graphics processing units (GPU).

\* \* \* \* \*